(12) United States Patent
Kirkland et al.

(10) Patent No.: US 12,017,420 B2
(45) Date of Patent: Jun. 25, 2024

(54) IMPACT-RESISTANT MOLDED COMPOSITES AND METHODS THEREFOR

(71) Applicant: Arris Composites Inc., Berkeley, CA (US)

(72) Inventors: Kenneth Kirkland, Sausalito, CA (US); Bert D. Mannhalter, Kensington, CA (US); J. Scott Perkins, Oakland, CA (US); Ethan Escowitz, Berkeley, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 36 days.

(21) Appl. No.: 17/373,566

(22) Filed: Jul. 12, 2021

(65) Prior Publication Data

US 2022/0009176 A1 Jan. 13, 2022

Related U.S. Application Data

(60) Provisional application No. 63/050,488, filed on Jul. 10, 2020.

(51) Int. Cl.
*B29C 70/42* (2006.01)
*B29C 70/06* (2006.01)
*B29C 70/86* (2006.01)
*B29K 101/12* (2006.01)
(Continued)

(52) U.S. Cl.
CPC .............. *B29C 70/42* (2013.01); *B29C 70/06* (2013.01); *B29C 70/86* (2013.01);
(Continued)

(58) Field of Classification Search
CPC ....... B29C 70/42; B29C 70/887; B29C 70/04; B29C 70/06; B29C 70/08; B29C 70/86;
(Continued)

(56) References Cited

U.S. PATENT DOCUMENTS 4,051,290 A * 9/1977 Jutte .................. B29D 99/0014
428/209
4,305,903 A 12/1981 Krause
(Continued)

FOREIGN PATENT DOCUMENTS

CN 202210908 5/2021
WO 2013/016482 1/2013

OTHER PUBLICATIONS

Authorized Officer Thierry Klinger, International Search Report dated Nov. 23, 2021 issued in PCT Patent Application No. PCT/US2021/041324.
(Continued)

*Primary Examiner* — Yunju Kim
(74) *Attorney, Agent, or Firm* — Kaplan Breyer Schwarz, LLP

(57) ABSTRACT

A method for improving the impact resistance of a fiber-composite part includes positioning fibers within an expected impact region of the part, wherein at least a portion of most of the positioned fibers is oriented to be within about 45 degrees of parallel to an impact vector of an impact that occurs at the impact region. At least some of the fibers in the impact region should have relatively high impact resistance, such as glass fiber or aramid fiber, and the matrix in the impact region should have relatively high impact resistance.

11 Claims, 7 Drawing Sheets

(51) Int. Cl.
 *B29K 307/04* (2006.01)
 *B29L 31/00* (2006.01)
(52) U.S. Cl.
 CPC ...... *B29K 2101/12* (2013.01); *B29K 2307/04* (2013.01); *B29L 2031/7162* (2013.01)
(58) Field of Classification Search
 CPC ..... B29C 70/202; B29C 70/207; B29C 70/22; B29C 70/222; B29C 70/081; B29C 70/083; B29C 70/10; B29C 70/12; B29C 70/14; B29C 70/16
 See application file for complete search history.

(56) References Cited

U.S. PATENT DOCUMENTS

| | | | | |
|---|---|---|---|---|
| 6,883,843 | B2* | 4/2005 | Van Damme | B60R 19/18 |
| | | | | 293/121 |
| 8,220,850 | B2* | 7/2012 | Opperman | B29C 70/226 |
| | | | | 428/102 |
| 8,771,575 | B2* | 7/2014 | Dequine | B29D 99/0003 |
| | | | | 264/258 |
| 10,946,595 | B2 | 3/2021 | Davidson et al. | |
| 2010/0289390 | A1 | 11/2010 | Kenney | |
| 2017/0090515 | A1 | 3/2017 | Stevick | |
| 2019/0143611 | A1* | 5/2019 | Jones | B29C 70/345 |
| | | | | 264/258 |
| 2020/0016846 | A1 | 1/2020 | Davidson et al. | |
| 2020/0108529 | A1 | 4/2020 | Davidson et al. | |
| 2020/0114596 | A1 | 4/2020 | Davidson et al. | |
| 2021/0187879 | A1 | 6/2021 | Escowitz et al. | |

OTHER PUBLICATIONS

Fixture and Method for Use in a Molding Process, U.S. Appl. No. 16/877,236.

* cited by examiner

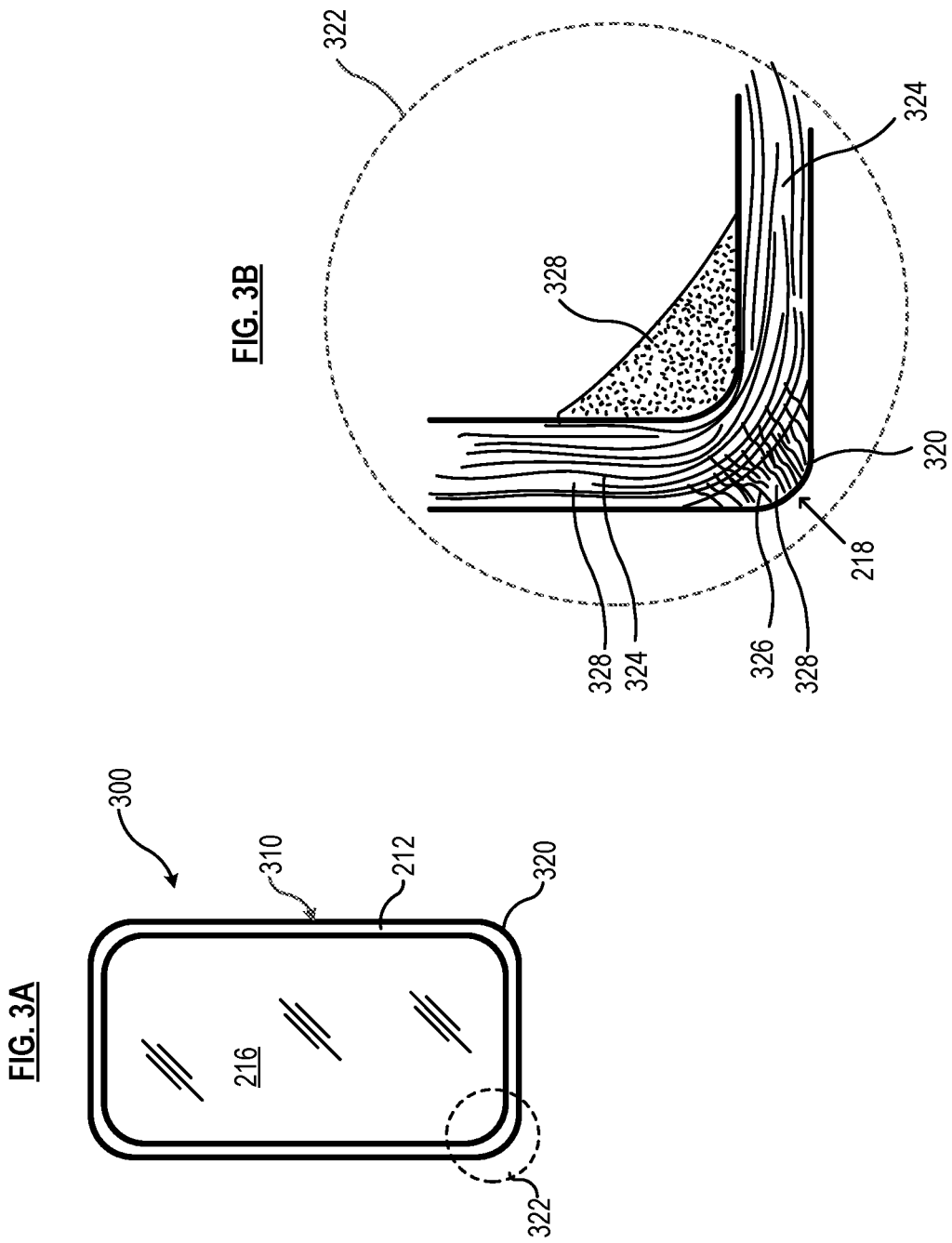

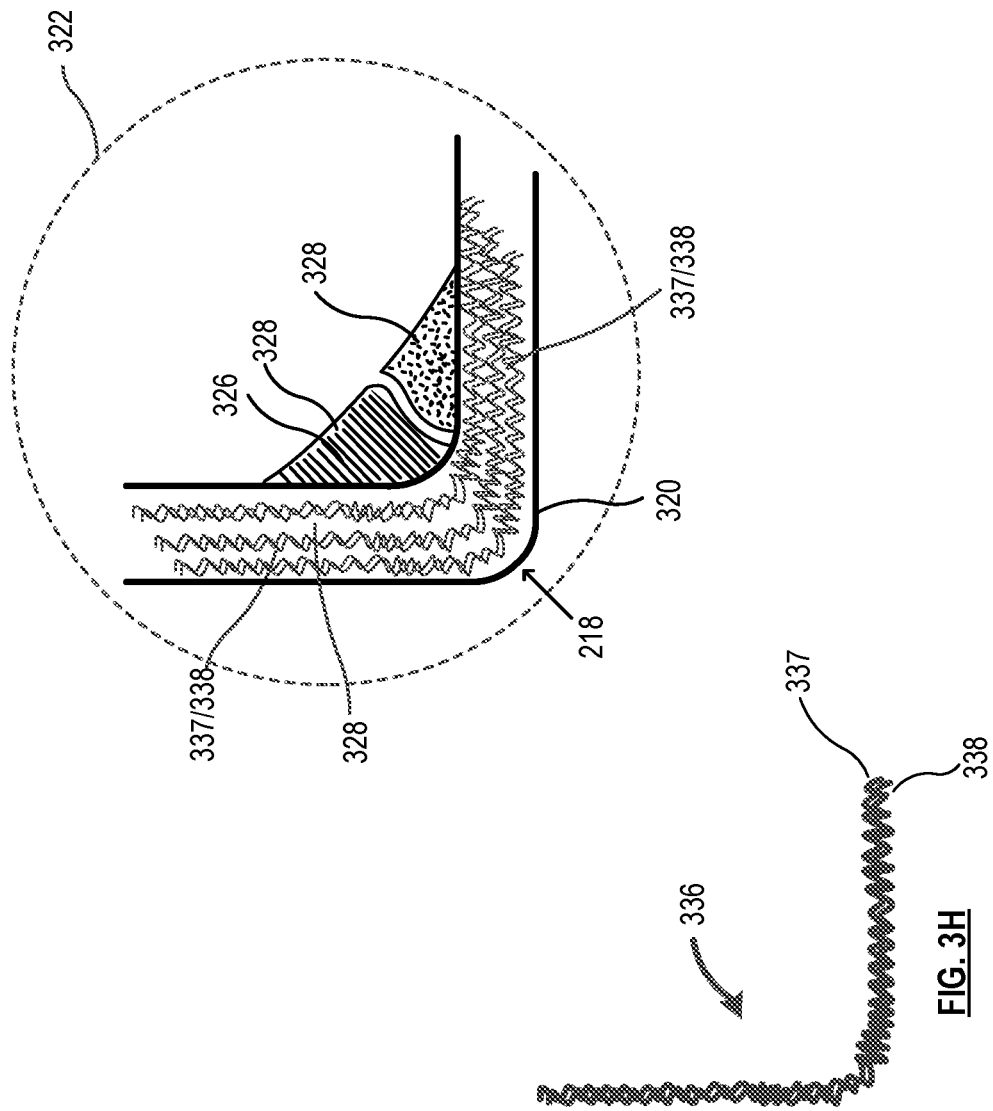
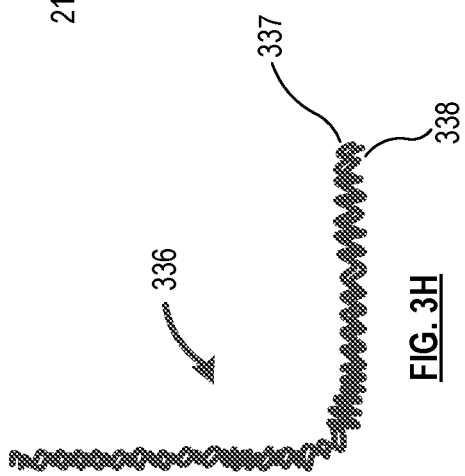

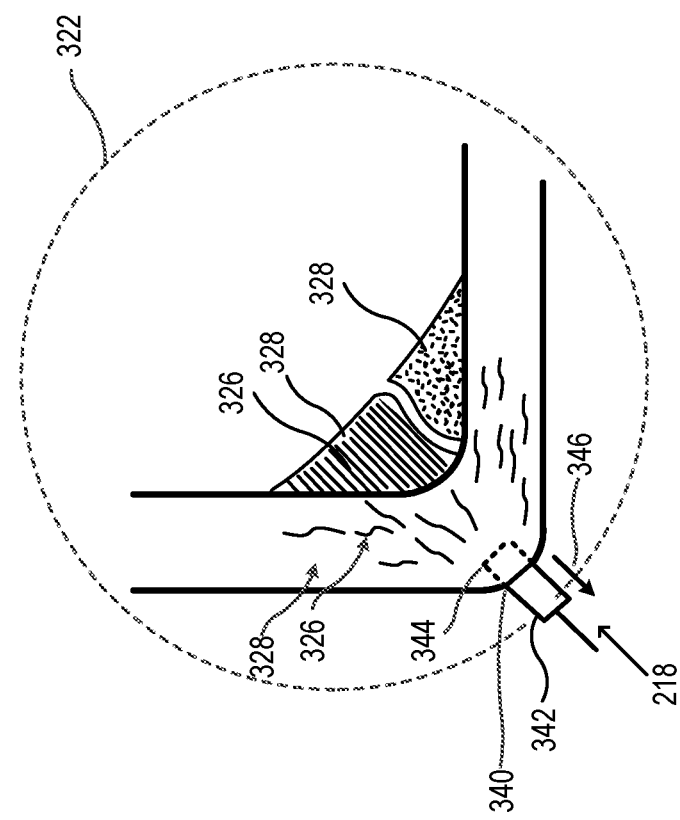

IMPACT-RESISTANT MOLDED COMPOSITES AND METHODS THEREFOR

STATEMENT OF RELATED CASES

This case claims priority to U.S. Pat. App. Ser. No. 63/050,488 filed Jul. 10, 2020, and which is incorporated herein by reference.

FIELD OF THE INVENTION

The present invention relates to fiber-composite parts, and more particularly, to fiber-composite parts having enhanced impact resistance.

BACKGROUND

Composites (i.e., fiber in resin matrix) offer many advantages over metals, primarily weight savings and specific stiffness and strength. While these criteria are paramount in many applications, there are other performance characteristics that may be of particular importance in some applications. For example, for some applications, impact resistance is important.

SUMMARY

In accordance with the invention, methods for improving the impact resistance of composite parts, structures for doing so, and composite parts with improved impact resistance are disclosed.

When a composite part experiences an "impact," the impact vector is typically oriented normal to the plane of the fibers. This is a consequence of fabrication limitations, as described further below. Although continuous fibers are known to impart strength to a composite part, in such a scenario (impact vector normal to fibers), impact resistance is at a relative minimum.

The aforementioned impact scenario is depicted in FIG. 1, which depicts panel portion 100 of a fiber-composite part. Panel portion 100 includes a plurality of in-plane, continuous, substantially unidirectionally aligned fibers 102. As depicted in FIG. 1, projectile 104, having impact vector 106, is about to impact panel portion 100. Impact vector 106 is substantially normal (perpendicular) to plane A-A of fibers 102 within panel portion 100.

As will be appreciated by those skilled in art, panels, such as panel portion 100, do not include fibers that are normal to plane A-A. Rather, due to processing constraints in the prior art, it has been feasible to situate continuous fibers in-plane only, along the planar, high-aspect ratio surfaces. Yet, due to anisotropy, the impact resistance of composites is at a relative maximum when a significant portion of the fibers, at least in the region of impact, are parallel to the impact vector (i.e., normal to plane A-A).

Applicant, in the course of its business, has been required to produce parts that are subject to impact-resistance specifications. Applicant recognized that this performance specification could potentially be met by adapting, to the specifics of the particular application, certain process improvements it had developed for compression molding processes; in particular, its ability to position, at arbitrary locations in complex part geometries, continuous aligned fibers.

In accordance with an illustrative embodiment, in a group of continuous fibers, many of such fibers will have at least a portion of their length oriented in a direction that is ideally parallel to the impact vector. As a practical matter, substantial improvements can be realized with fibers oriented within 60 degrees of parallel, and more preferably about 45 degrees of parallel with respect to the impact vector.

In accordance with some embodiments, preforms having a variety of unique form factors are used for the purpose of orienting fibers parallel, to the extent possible, to a given impact vector. In some further embodiments, processing methods involving specific process parameters and tooling aspects are used to orient fibers parallel, to the extent possible, to a given impact vector. In yet some further embodiments, material methods are provided which involve the incorporation of regions having neat resin (i.e., no fiber), as well as those having resin-impregnated fibers, to improve impact resistance by virtue of material properties and geometry of implementation. The various preform designs, material methods, and processing methods can be implemented to achieve a particular performance goal in a specific impact region of a given part. Moreover, these methods can be used individually, or in combination, to provide composite parts have a higher impact resistance—via engineered energy absorption to minimize undesirable plastic deformation—than is achievable via techniques in the prior art.

Although the embodiments disclosed herein are equally applicable to imparting high-velocity impact resistance, the applications that are the focus of the present invention are primarily directed to low-velocity impact resistance. An example of a low-velocity impact is a mobile phone falling to the ground from a user's hand. The present teaching, in fact, applies to impacts of any velocity.

Some embodiments of the invention provide a method comprising: positioning an assemblage of feed constituents in a mold, wherein the assemblage of feed constituents include fiber and resin in the form of at least one of a plurality of preforms or a plurality of misaligned preforms, wherein the assemblage is positioned so that, during compression molding to form a fiber-composite part, at least a first portion of each fiber of a first plurality of fibers sourced from some of either the preforms or misaligned preforms in the assemblage will be within about 45 degrees of parallel ("45 DOP") to an impact vector of an impact at a first region of the fiber-composite part; and compression molding the assemblage of feed constituents to form the fiber-composite part having the fibers in which the first portion thereof is within about 45 DOP to the impact vector in the first region.

Some embodiments of the invention provide a fiber-composite part comprising a rib, the rib having two straight segments coupled by a corner portion, the rib comprising fibers within a thermoplastic matrix, wherein a first region of the fiber-composite part, which includes the corner portion and a portion of the two straight segments, comprises a first plurality of fibers, each having a portion oriented within about 45 degrees of parallel to an impact vector of an impact that occurs a first surface of the rib, proximal to the corner portion thereof.

Summarizing, method, as depicted and described, comprises: (i) positioning an assemblage of feed constituents in a mold, and (ii) compression molding the assemblage, such that the resulting fiber-composite part has fibers that are within about 45 DOP to an impact vector of an impact. The fiber-composite part, as depicted and described, comprises (i) a rib comprising fibers within a thermoplastic matrix, and (ii) some of the fibers of the rib have a portion that is oriented within about 45 DOP to an impact vector of an impact. Embodiments of the aforementioned method and fiber-composite part may further comprise any or more of the following operations/features, as appropriate, in any (non-conflicting) combination, among others disclosed herein:

forming the assemblage of feed constituents;
the relative positioning of preforms and/or misaligned preforms in a mold;
preforms having long continuous fibers that do not flow, their selective placement in an assemblage, and their placement in a mold;
preforms having fibers that are suitably short to flow, their selective placement in an assemblage, and their placement in a mold;
misaligned preforms having fibers with a 180-degree bend, their selective placement in an assemblage, and their placement in a mold;
misaligned preforms having fibers that are spiraled around non-spiraled fibers, their selective placement in an assemblage, and their placement in a mold;
misaligned preforms having fibers that are spiraled about spiraled fibers, their selective placement in an assemblage, and their placement in a mold;
selective placement of fiber-free thermoplastic matrix within a rib;
selective placement of fiber-free thermoplastic matrix external and adjacent to a rib;
regions of fibers external and adjacent to a rib, wherein the fibers have a portion that is oriented within about 45 DOP to an impact vector of an impact;
a rib containing two different types of fibers in an impact region;
a rib containing both fiber in thermoplastic matrix, and fiber-free thermoplastic matrix in an impact region;
a rib containing segments of fiber-composite tape, wherein the tape is closest to surfaces of the rib, and wherein the segments of tape sandwich fibers and thermoplastic matrix therebetween;
a rib containing a metal strip proximal to the surface of the rib in an impact region thereof; and
flowing fibers to an impact region and aligning at least a portion of the fibers within about 45 DOP to an impact vector by venting the impact region.

BRIEF DESCRIPTION OF THE DRAWINGS

FIG. 3A depicts a mobile-phone enclosure having enhanced impact regions at the corners thereof, in accordance with the present teachings.
FIG. 3B depicts a first embodiment of an enhanced impact region, such as for use in conjunction with the mobile-phone enclosure of FIG. 3A.
FIG. 3H depicts a preform for use in the enhanced impact region of FIG. 3I.
FIG. 3I depicts a fifth embodiment of an enhanced impact region, such as for use in the mobile-phone enclosure of FIG. 3A.
FIG. 3J depicts a manner in which tooling can be used to create the enhanced impact regions depicted in some of the figures.

DETAILED DESCRIPTION

Figure 1:
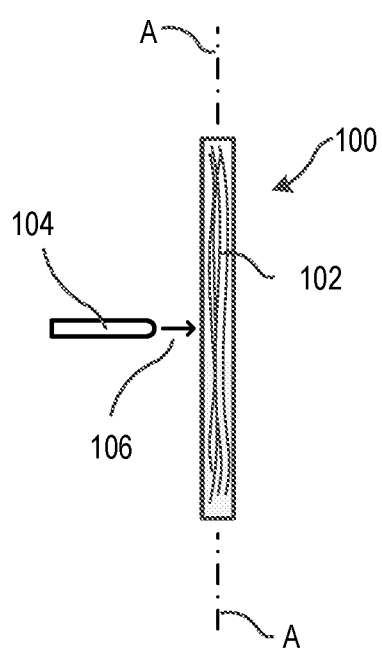
FIG. 1 depicts an impact scenario in the prior art.

Definitions. The following terms are defined for use in this description and the appended claims:

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" or "Fiber-bundle-based preform," used interchangeably, means a bundle of plural, unidirectionally aligned, same-length, resin-wetted fibers. The plural fibers in each bundle are typically present in multiples of a thousand (e.g., 1 k, 10 k, 24 k, etc.). The fibers align with the major axis of their host preform. The bundle is often (but not necessarily) sourced from a long length of towpreg. That is, the bundle is a segment of towpreg that has been cut to a desired size and, in many cases, is shaped (e.g., bent, twisted, etc.) to a specific form, as appropriate for the specific part being molded. Alternatively, the bundle of fibers can be sourced directly from impregnation processes, as known to those skilled in the art. Whatever the source, the fiber bundles, and hence the preforms, can have any suitable cross-section, such as, without limitation, circular, oval, trilobal, and polygonal. However, the aspect ratio (width-to-thickness) of the cross section is between about 0.25 to about 6. That is, a "fiber-bundle-based preform" is distinguished from relatively flat form factors, and explicitly excludes any size of shaped pieces of: (i) tape (typically having an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Compression molding" is a molding process that involves the application of heat and pressure to feed constituents for a period of time. For applicant's processes, the applied pressure is usually in the range of about 500 psi to about 3000 psi, and temperature, which is a function of the particular resin being used, is typically in the range of about 150° C. to about 400° C. Once the applied heat has increased the temperature of the resin above its melt temperature, it is no longer solid. The resin will then conform to the mold geometry via the applied pressure. Elevated pressure and temperature are typically maintained for a few minutes. Thereafter, the mold is removed from the source of pressure and is cooled. Once cooled, a finished part is removed from the mold.

"About" or "Substantially" means +/−20% with respect to a stated figure or nominal value.

Other definitions are provided elsewhere in this specification, in context.

Embodiments of the invention provide methods and structures that provide improvements in the impact resistance of composite parts. As used herein, the term "impact resistance" or "impact resistant" references an ability of the part, by virtue of fiber alignment, fiber type, and resin type, to absorb the energy of impact, and/or transfer and/or contain the energy of impact to a region of the part, thereby protecting other regions of the part. Thus, some embodiments are analogous to crush zones in the body of an automobile.

Unlike material properties such as modulus, impact resistance is less clearly defined. There are few standardized tests, and quantification of impact properties is nuanced. Thus, most impact requirements are application specific, as opposed to being inherent material properties. Across all relevant applications, impact requirements can vary on the basis of velocity of impact, the angle of the impact vector, elastic deformation versus plastic deformation, and energy absorption, among other qualities. The noteworthy consideration is that anisotropic properties of composites are agnostic to varying impact requirements. That is, aligning fibers relatively more parallel to a given impact vector will improve performance under all conditions: at high or low impact velocities, elastic or plastic deformation, etc.

Embodiments of the invention involve the use of fibers and polymer resins known to improve impact resistance. However, unlike their usage in the prior art, and in accordance with the present teachings, these materials are organized for molding in a way that results in a finished part having fiber alignments that are advantageous for impact resistance and are not possible using prior-art techniques. In particular, and as described further below, the novel fiber alignments result from one or more of the following features, among others mentioned in this disclosure:

- preforms that are characterized by a selective misalignment of some fibers within a segment of mostly unidirectionally aligned fibers ("misaligned preforms");
- selective placement of non-fiber-bearing resin;
- the specifics of preform geometry;
- positioning of preforms relative to one another in the mold;
- creating fibers suitable for flowing, and flowing them to a desired location;
- selective placement of fiber-bearing tape; and
- selective placement of a metal strip.

To create the desired fiber alignments, fiber-bundle-based preforms and preform charges, as defined herein, are used primarily. Each preform, like the spool of prepreg or the impregnation-line output from which it is sourced, include thousands of unidirectionally aligned, resin-infused fibers, typically in multiples of one thousand (e.g., 1 k, 10 k, 24 k, etc.). A preform may have any suitable cross-sectional shape (e.g., circular, oval, trilobal, polygonal, etc.). As described below in more detail, in some embodiments, such fiber-bundle-based preforms are modified to include "misaligned" fibers. Such fibers are not aligned with the major axis of the preform and/or do not have a strictly linear form. Preforms containing such misaligned fibers are referred to herein as "misaligned preforms." Moreover, in some embodiments, prepreg tape is used. In still further embodiments, metal inserts are used. Embodiments of the invention may include any one or more of fiber-bundle-based preforms, misaligned preforms, prepreg tape, and metal inserts.

For a variety of reasons, in some embodiments, rather than adding individual preforms to a mold (i.e., forming a "lay-up" as is conventional in compression molding), one or more assemblages of such preforms—referred to herein as a "preform charge"—is placed in the mold. The preform charge, which is typically a three-dimensional arrangement of preforms, is usually created in a fixture separate from the mold, and which is dedicated and specifically designed for that purpose. To create a preform charge, preforms are placed (either automatically or by hand) in a preform-charge fixture. By virtue of the configuration of the fixture, the preforms are organized into a specific geometry and then bound together, such as via heating and minimal applied pressure. The shape of the preform charge usually mirrors that of the intended part, or a portion of it, and, hence, the mold cavity (or at least a portion thereof) that forms the part. See, e.g., Publ. Pat. Apps US2020/0114596 and US2020/03261122, incorporated herein by reference.

As compared to a final part in which fibers/resin are fully consolidated, in a preform charge, the preforms are only partially consolidated. This is because there is insufficient pressure, and possibly even insufficient temperature for full consolidation. By way of example, whereas applicant's compression-molding processes are often conducted at a pressure of thousands of psi, the downward pressure applied to the constituents to create a preform charge in accordance with the present teachings is typically in the range of about 10 psi to about 500 psi. Thus, voids remain in a preform charge, and, as such, the preform charge cannot be used as a finished part. As used herein, the term "assemblage of feed constituents" refers to either a lay-up of the feed constituents, or a preform charge.

Although a preform charge is not fully consolidated, the preforms therein will not move, thereby maintaining the desired geometry and the specific alignment of each preform in the assemblage. This is important for creating a desired fiber alignment in the mold, and, hence, in the final part.

In accordance with embodiments of the invention, certain preform geometries, form factors, and assemblages of feed constituents, which are intended to orient at least portions of individual fibers within +/−45 degrees of parallel (hereinafter "45 DOP") to a given impact vector, particularly within an impact region, form an aspect of the preform-charge design.

In some applications, part geometry in an impact region inhibits the fibers that align with the major axis of a preform from being oriented within 45 DOP to an impact vector using existing methods, including applicant's previously developed methods. Consider, for example, FIG. 2, which depicts prior-art mobile-phone enclosure 200, which has a planar portion 216 that is substantially the same size as the phone. Enclosure 200 also includes rib 210 disposed at the perimeter of planar portion 216. Rib 210 includes straight segments 212 and rounded corner segments 214. If a mobile phone is dropped, it will often impact one of the corners 214. (It is notable that enclosure 200 is part of the phone, itself;

it is not a separate protective/ornamental case, as is often purchased at the time of sale along with the phone.)

Figure 2:
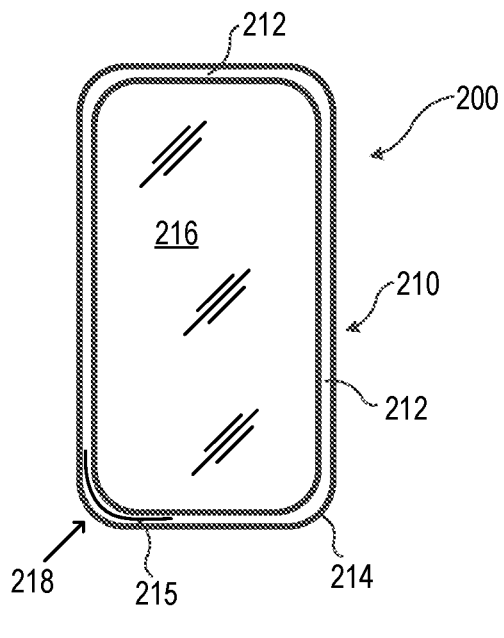
FIG. 2 depicts a prior-art mobile-phone enclosure.

Considering the thickness of the rib 210 relative to towpreg (and hence preform) diameters commonly employed by the applicant (c.a., rib thickness 1-3 mm, tow diameter 1-2 mm), it is only feasible to align preforms along the major axis (i.e., the length) of rib 210. The implication of this constraint is that impact vector 218 of a typical corner impact will be normal to fibers 215, as depicted in FIG. 2. As previously noted, impact resistance is at a relative minimum when the impact vector is oriented normal to the fiber alignment.

FIG. 3A depicts mobile-phone enclosure 300 with enhanced impact resistance in accordance with the illustrative embodiment.

Like the prior-art enclosure 200, enclosure 300 has planar portion 216 that is substantially the same size as a mobile phone. Enclosure 300 includes rib 310 disposed at the perimeter of planar portion 216. Rib 310 includes straight segments 212 and rounded corner segments 320. Corner segments 320 exhibit enhanced impact resistance, in accordance with the present teachings. FIGS. 3B, 3C, 3E, 3G, 3I, and 3J depict details of various embodiments of impact region 322, which includes corner segments 320 of the rib.

It is notable that in many applications, planar portion 216 will not accompany rib 310; that is, only a rib is fabricated and incorporated into the case of a mobile phone. More generally, in some embodiments, a rib fabricated for any use will not be accompanied by a planar portion, such as planar portion 216. The embodiments described herein are generally applicable to "rib-only" fabrication. For the remainder of the specification, including the appended claims, the impact vector of impacts occurring at a curved surface of a part, such as corner segment 320 of rib 310 of mobile-phone enclosure 300, are assumed to occur normal to the tangent of curved surface at the point of impact.

FIG. 3B depicts a first embodiment of impact region 322. In this embodiment, impact region includes two types of fiber (i.e., fibers 324 and 326) and a region of neat resin (i.e., no fiber).

More particularly, corner segment 320 within impact region 322 of FIG. 3B includes continuous carbon fibers 324 in an impact-resistant matrix 328, both of which extend from one side of impact region 322 to the other. Such continuous fibers 324 are sourced, for example, from preforms comprising carbon fiber with an impact-resistant thermoplastic polymer resin. Although carbon fiber is stronger than glass or aramid fiber, and therefore strengthens the rib, it is nevertheless less impact resistant than those materials. As such, in some embodiments, carbon fiber is preferably not used near the surface of the rib where impact occurs; rather, an impact-resistance fiber 326, such as the aforementioned glass or aramid fiber, is preferably used at that location.

In addition to selecting fiber for impact resistance, a thermoplastic resin can be relatively more or relatively less impact resistant. Consequently, an impact-resistant resin, such as, without limitation, TPU (thermoplastic polyurethane), PC (polycarbonate), PPO (polyphenylene oxide), PPE (polyphenylene ether) is chosen for use in rib 310. Both fiber type and resin type can be locally varied along the rib; however, to the extent different resins are used, they must be compatible with one another.

As previously noted, pre-aligning preforms to position impact-resistant fibers 326 to be within 45 DOP to impact vector 218 is typically not possible in rib 310, because that would require the use of an unfeasibly small preform. As such, impact-resistant fibers 326 cannot simply be positioned as shown. Rather, such fibers are "flowed" to this location, as described later in this specification in conjunction with FIG. 3J.

Outside of rib 310 proper, nearest corner portion 320 and adjacent to its inward-facing surface, is a region of neat, impact-resistant matrix 328 (i.e., no fibers). The material in this region is formed from preforms consisting only of resin, no fiber. As previously noted, impact-resistant thermoplastic resins include, TPU, PC, PPO, and PPE, among others. The volume and location of such neat resin regions are determined by simulation and testing. Such a region is analogous to a sacrificial crush zone on a car; the intent is to absorb impact energy to preserve other aspects of the part. This region of neat resin can be formed even in embodiments in which planar region 216 is not present.

Figure 3E:
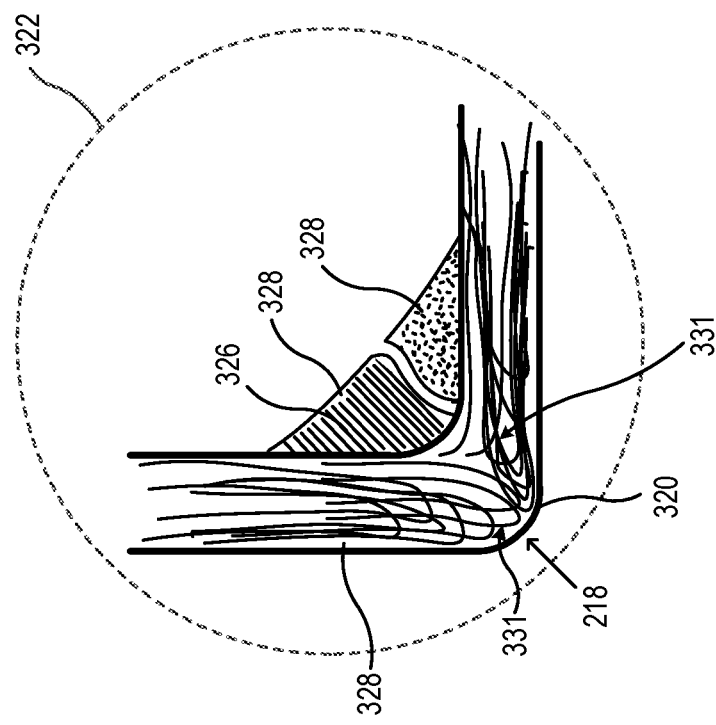
FIG. 3E depicts a third embodiment of an enhanced impact region, such as for use in the mobile-phone enclosure of FIG. 3A.
Figure 3D:
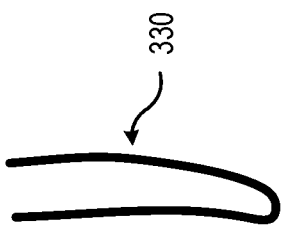
FIG. 3D depicts a preform for use in the enhanced impact region of FIG. 3E.
Figure 3C:
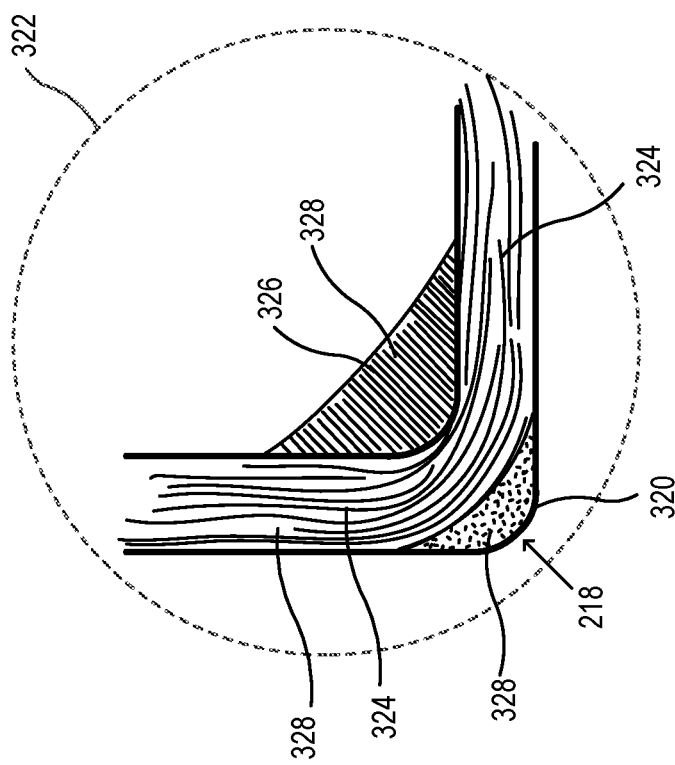
FIG. 3C depicts a second embodiment of an enhanced impact region, such as for use in the mobile-phone enclosure of FIG. 3A.

In some other embodiments, rather than having a region of neat matrix on the inside of corner 320, a region of impact-resistant composite material (i.e., impact-resistant fibers and impact-resistant resin) is formed there (see, e.g., FIG. 3C).

In the embodiment depicted in FIG. 3B, preforms consisting of neat resin (the source of neat impact-resistant matrix 328), as well as preforms consisting of resin-infused fiber (for forming the region of fiber 324 in impact-resistant matrix 328) are positioned in the assemblage of feed constituents so that the materials therefrom will ultimately occupy a desired location with respect to the impact region in the final part.

In regions of a part other than where impact is likely, the individual fibers in the feed constituents may include, without limitation, glass, natural fibers, carbon, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used. Hybrid yarns consisting of twisted or commingled strands of fibers and polymer filaments can also be used as preforms.

Suitable resins for use in regions other than likely sites of impact include any thermoplastic polymer, such as, without limitation, acrylonitrile butadiene styrene (ABS), nylon, polyaryletherketones (PAEK), polybutylene terephthalate (PBT), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). And, of course, the aforementioned impact-resistant resins (TPU, PC, PPO, and PPE) as well as any others may suitably be used at regions other than likely impact sites. However, to the extent different resins are used in the impact region and non-impact regions, such resins must be compatible with one another.

FIG. 3C depicts an embodiment wherein the location of the neat impact-resistant matrix 328 and impact resistant fibers 326 are reversed. As in the embodiment depicted in FIG. 3B, continuous carbon fibers 324 in impact-resistant matrix 328 extend from one side of impact region 322 to the other side. Although fibers 326 are illustrated as being straight, parallel to one another, and parallel to impact vector 218, in practice, this is not possible. Rather, using the methods described herein, a portion(s) of many of fibers 326 can be oriented so that they are within 60 DOP, and more preferably 45 DOP of impact vector 218.

FIGS. 3D and 3E depict a further embodiment in which portions of individual fibers are within 45 DOP to impact vector 218. In this embodiment, linear preforms 330 (FIG. 3D) are folded (i.e., a 180-degree bend), and positioned in the preform charge so that the fold in many of fibers 331 sourced from preforms 330 (as previously noted a preform will include thousands of individual fibers) is positioned within a given impact region—in this embodiment, impact region 322. The abrupt change in fiber orientation at the fold locally positions a portion of folded fibers 331 within about 45 DOP to impact vector 218. Layering of such preforms is advantageous to distribute folded fibers throughout an impact region.

On the inside of corner 320, beyond the confines of the rib, is region of neat impact-resistant matrix 328 (i.e., no fibers), or a region of impact-resistant fibers 326 in impact-resistant matrix 328. FIG. 3E shows both regions for pedagogical purposes, but this area is occupied by one or the other of the neat matrix or fiber/matrix composite.

Preforms used by the applicant generally consist of unidirectional fibers that are aligned with the major axis of the perform. In accordance with the present teachings, fiber-bundle-based preforms having a portion of "misaligned" fibers are used in conjunction with some embodiments of the invention. At least a portion of each misaligned fiber is likely to be oriented within 45 DOP to impact vectors in the molded part.

Fiber misalignment in fiber-bundle-based preforms can be achieved by wrapping, weaving, braiding, and/or spiraling a subset of fibers around fibers aligned to the major axis. Preforms having misaligned fibers (referred to herein as "misaligned preforms") include the foregoing, as well as braided prepreg, fibers comingled with neat resin filament, multiple towpreg strands twisted together, and towpreg strands enveloped by spiraled or woven fibers. In some embodiments, misaligned fibers are partially impregnated with resin initially, and become fully impregnated once subjected to pressure and heat during the molding process. It should be noted that use of any one misaligned preform embodiment is not mutually exclusive. That is, any combination of embodiments can be used in conjunction with each other, provided their resins are alike or otherwise compatible.

Misaligned preforms are positioned within a preform charge such that the orientation of misaligned fibers, or some portion of each such misaligned fiber, is within about 45 DOP to a given impact vector. This is accomplished by forming the misaligned preforms into geometries that, when positioned within an impact region, will orient misaligned fibers as desired, thus improving impact resistance.

Figure 3G:
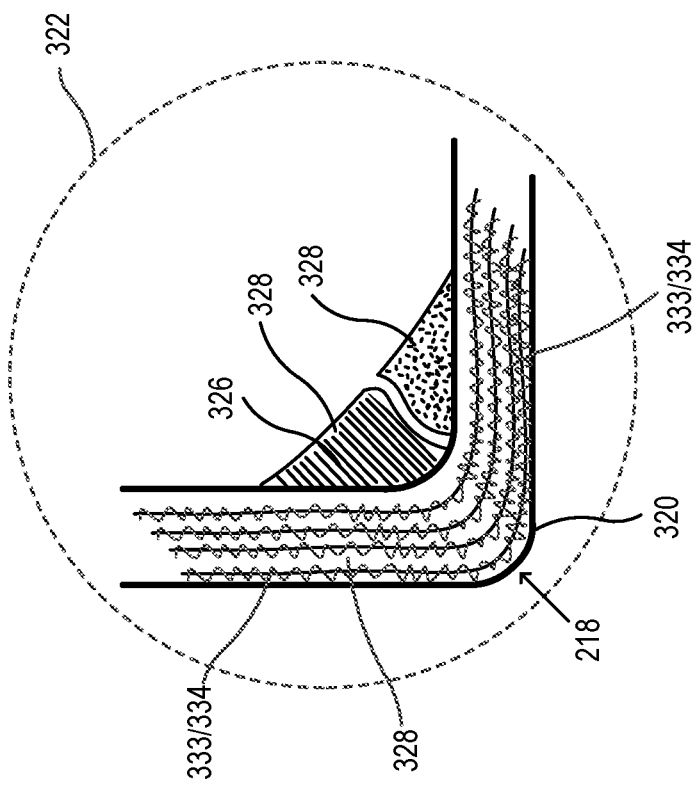
FIG. 3G depicts a fourth embodiment of an enhanced impact region, such as for use in the mobile-phone enclosure of FIG. 3A.
Figure 3F:
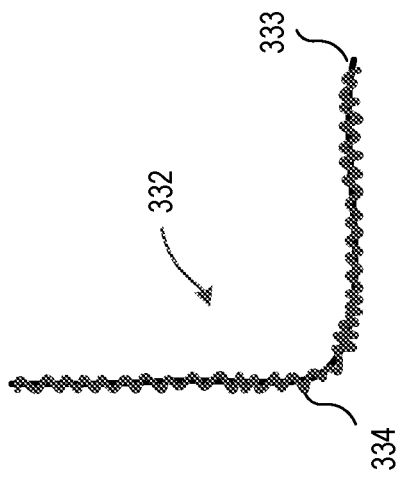
FIG. 3F depicts a preform for use in the enhanced impact region of FIG. 3G.

FIGS. 3F and 3G depict an embodiment of impact region 322 wherein the misaligned preform 332 includes many (thousands) of fibers 334 spiraled around a bundle of fibers 333 having a linear but bent form (i.e., not a 3D form like spiraled fibers) and aligned with the major axis of the preform. For clarity, FIG. 3G depicts a single fiber spiraled about an "aligned" fiber. In practice, there are typically many fibers spiraled about multiple "aligned" fibers. The use of misaligned preforms in impact region 322 has the effect of orienting at least some portions of each spiraled fiber within about 45 DOP to a given impact vector 218.

And once again, on the inside of corner portion 320, beyond the rib, is region of neat impact-resistant matrix 328, or a region of impact-resistant fibers 326 in impact-resistant matrix 328.

FIGS. 3H and 3I depict an embodiment of impact region 322 wherein the misaligned preform 336 includes thousands of fibers spiraled about one another; that is, the preform predominantly contains groups of spiraled fibers, that are further spiraled about one another, rather than a group of fibers that are spiraled around a bundle of bent but linear form fibers as in preform 332 in FIGS. 3F and 3G. For clarity, FIG. 3I depicts two fibers spiraled about one another; in practice, there are typically many fibers spiraled together. As in the previous embodiment, the use of misaligned preforms in impact region 322 has the effect of orienting at least some portions of many of the spiraled fibers within about 45 DOP to a given impact vector 218.

As in previous embodiments, on the inside of corner 320, beyond the rib, there is region 328 of neat impact-resistant matrix (i.e., no fibers), or a region of impact-resistant fibers 326 in impact-resistant matrix 328.

FIG. 3J depicts a method by which portions of fibers can be positioned with about 45 DOP to likely impact vectors at specific regions. Continuous fibers running along the long axis of the rib, such as fibers 324, 331, etc. have been omitted from FIG. 3J for clarity.

As described for example in U.S. Pat. No. 10,946,595, and US2021/0187879, relatively short fibers, particularly when placed in the vicinity of intended destination, can be flowed to the destination, such as via the use of vents. In its melt flow state, resin will flow from areas of higher pressure to areas of lower pressure. Short fibers (c.a., having a length less than about 100 mm) will flow along with the resin. Thus, actuated slider 342 is positioned in vent 340 at a likely impact region. Dashed lines 344 indicate the position of slider 342 before it is actuated. When actuated (mechanism not depicted), slider moves in the direction of arrow 346, creating a negative pressure gradient within the region. That is, the displacement of slider 342 changes the volume of the region within the tool cavity during processing. That causes melted impact-resistant resin 328 and short fibers 326 to flow towards vent 340. Fibers tend to align with the direction of flow, with the result that fibers 326 tend to mass near corner 320, with at least a portion of some of those fibers oriented within about 45 DOP to the impact vector at the location (i.e., impact vector 218). The final position of the flowed fibers is depicted in FIG. 3B.

Figure 4:
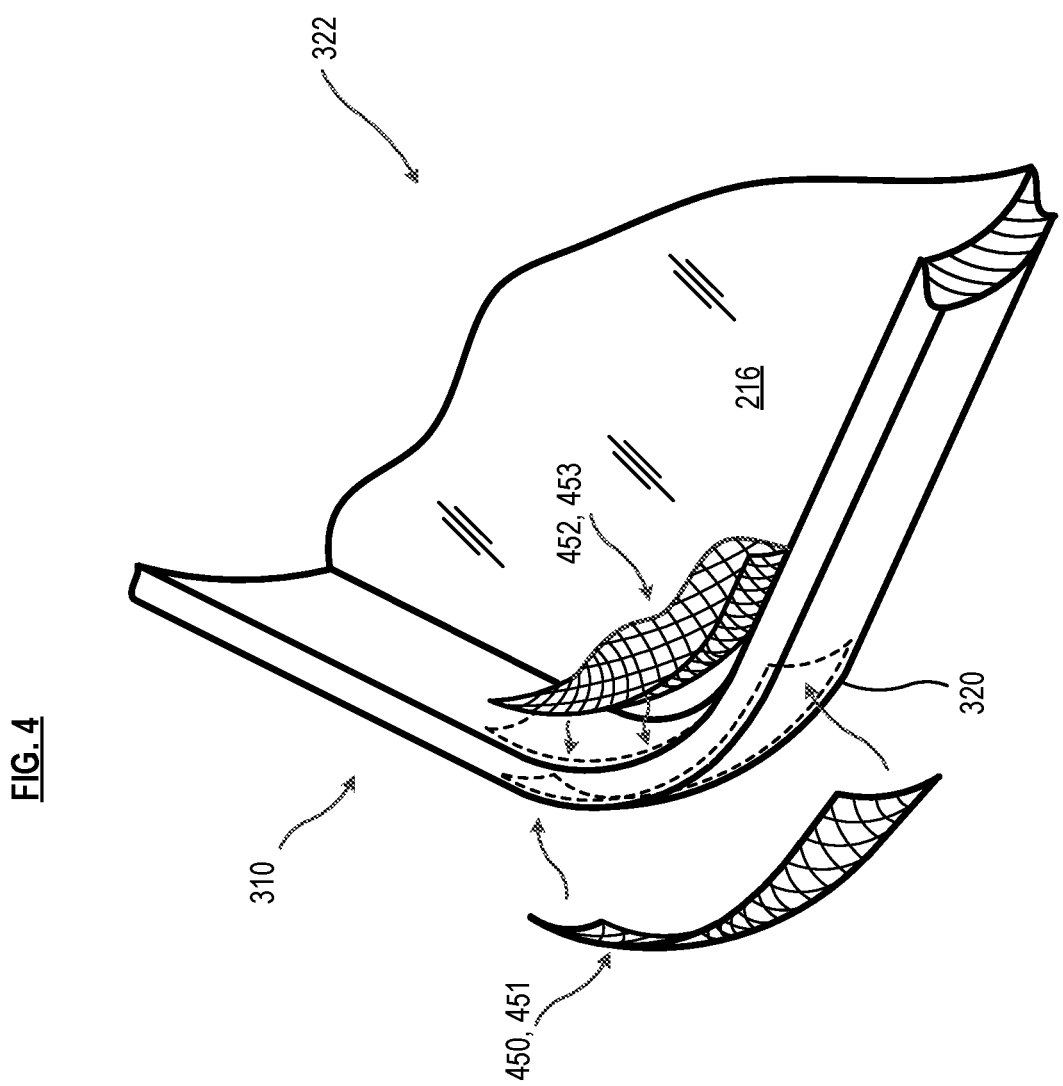
FIG. 4 depicts a sixth embodiment of an enhanced impact region, such as for use in the mobile-phone enclosure of FIG. 3A.

Referring now to FIG. 4, tape segments or metal inserts can also be employed within an impact region. In FIG. 4, tape segments 450 and 452 (or metal insert 451 and 453) are used as a "wrap."

With respect to the tape segments, given the high aspect ratio and unidirectional fiber alignment of tape, segments of tape plies cut to shape can be incorporated in the rib, sandwiching layers of applicant's fiber-bundle-based preforms. In such embodiments, the tape functions to keep the material in the rib (i.e., fibers and resin) stabilized when an impact occurs. That is, tape 450 and 452 helps prevent the fibers/resin from spreading in a direction normal to the impact vector (i.e., along the length of the rib). The tape can be integrated into a preform charge.

Metal inserts 451 and 453, having a form factor like the tape segments, can function in similar fashion (i.e., containment), in addition to providing considerable impact resistance by virtue of their composition. By appropriately shaping and positioning such inserts in a preform charge, they can be integrated such that they resist impact and interlock with the surrounding composite.

Heat and pressure, the defining characteristics of compression molding, can be used to facilitate selective fiber flow in certain embodiments. For example, by differentially heating the top and bottom halves of a mold, preforms that have been positioned in an assemblage of feed constituents such that they contact the hotter surface can be brought to a higher temperature than their surroundings (i.e., other preforms). These preforms—specifically the resin therein—thus becomes relatively more viscous than that of other preforms, and will be first to flow into (or out of) an impact region with concomitantly timed application of pressure. Thus, provisioning the first-to-flow preforms with suitably short fibers will enable flowing the fibers along with the resin to a desired location and with a desired alignment.

With respect to relatively shorter fibers that are intended to flow, their length is selected to provide an overlap, entangling with the relatively longer fibers oriented along the long axis of the rib. For example, referring to FIG. 3B, it is desirable to size fibers 326 to provide overlap with fibers 324. Such overlap will help to dissipate the energy of impact along the length of rib 310.

It is to be understood that the methods and materials described herein are useful for enhancing the impact resistance of any composite part and at any location of the part. Furthermore, any one or more of the arrangements, methods, and materials described above can be used together to enhance impact resistance.

What is claimed:

1. A method comprising:
    positioning an assemblage of feed constituents in a mold, the assemblage of feed constituents including fibers and resin in the form of at least one of (i) a plurality of preforms and (ii) a plurality of misaligned preforms, the misaligned preforms being characterized by a selective misalignment of a minor portion of fibers therein amongst a majority of unidirectionality aligned fibers therein, wherein the fibers will not flow during compression molding due to a length thereof, and wherein as positioned and aligned in the mold, at least a first portion of each fiber of a first plurality of fibers sourced from some of the preforms or some of the misaligned preforms will be substantially parallel to an impact vector for an impact occurring at a first location along a rounded corner, wherein the first plurality of fibers are glass fibers or aramid fibers, and wherein the impact vector is normal to the tangent of the rounded corner at the first location; and
    compression molding the assemblage of feed constituents to form a fiber-composite part having the fibers in which the first portion thereof is substantially parallel to the impact vector.

2. The method of claim 1 comprising forming the assemblage of feed constituents.

3. The method of claim 1 wherein the assemblage of feed constituents comprises the plurality of preforms, wherein at least some of the preforms have about a 180-degree bend along a length thereof, and wherein the first plurality of fibers is sourced from said some preforms, and the first portion of each fiber that is substantially parallel to the impact vector is located at the bend in each fiber.

4. The method of claim 1 wherein the assemblage of feed constituents comprises the plurality of misaligned preforms, wherein the minor portion of fibers that are selectively misaligned in each misaligned preform includes fibers that are spiraled around other fibers within the misaligned preform, wherein the first plurality of fibers is sourced from the misaligned preforms, and the first portion of each fiber that is substantially parallel to the impact vector is located along the fibers that are spiraled.

5. The method of claim 1 wherein the fiber-composite part comprises a rib, wherein the assemblage of feed constituents includes the plurality of preforms, wherein positioning the assemblage of feed constituents comprises aligning, in the mold, at least some of the preforms parallel to a long axis of the rib.

6. The method of claim 5 wherein the fibers in the preforms aligned with parallel to the long axis of the rib are carbon fibers.

7. The method of claim 5 comprising forming a region of fiber-free thermoplastic matrix external to the rib and adjacent to a surface of the rounded corner of the rib, wherein the surface adjacent to the fiber-free thermoplastic matrix is opposite to a surface of the rib where the impact occurs.

8. The method of claim 1 wherein the resin from the plurality of preforms or the plurality of misaligned preforms that is positioned proximate to the rounded corner is a thermoplastic polymer selected from the group consisting of thermoplastic polyurethane, polycarbonate, polyphenylene oxide, and polyphenylene ether.

9. A method comprising:
    forming an assemblage of feed constituents, wherein the assemblage includes fibers and resin in the form of a plurality of preforms, wherein at least one of the preforms of the plurality includes fibers that are suitably short to flow with resin during compression molding to form a fiber-composite part having a rounded corner;
    positioning, in a mold cavity that includes a rounded corner, the assemblage of feed constituents such that the preform having the suitably short fibers is proximal to the rounded corner of the mold cavity;
    opening, in the mold cavity, a vent by actuating a slider associated with the vent, the vent having a location that is proximal to a center of a length of a curved surface defining the rounded corner; and
    compression molding the assemblage of feed constituents, wherein the open vent causes the short fibers to flow towards the vent along with a flow of resin thereto, so that, in the fiber-composite part being formed, the short fibers substantially align with an axis that is normal to the tangent of the curved surface defining the round corner at the location of the vent.

10. A method comprising:
    forming an assemblage of feed constituents for compression molding a fiber-composite part having a rounded corner, wherein the assemblage includes fibers and resin in the form of a plurality of misaligned preforms, wherein the misaligned preforms are characterized by selective misalignment of some of the fibers within a segment of mostly unidirectionally aligned fibers;
    positioning, in a mold cavity that includes a rounded corner, the assemblage of feed constituents such that at least a portion of each of the misaligned preforms are curved along a long axis thereof to align with and substantially match a curvature of the rounded corner of the mold cavity;
    compression molding the assemblage of feed constituents to form the fiber composite part having the rounded corner.

11. The method of claim 10 wherein the fiber composite part comprises a first linear surface and a second linear surface, which are oriented at about ninety degrees relative to one another, wherein the first linear surface terminates at a first end of the rounded corner and the second linear surface terminates at a second end of the rounded corner, and wherein each of the misaligned preforms include two linear portions, one of such linear portions disposed on each side of the portion of the misaligned preform that is curved, wherein the linear portions of the misaligned preforms align with and parallel respective first and second linear surfaces.

* * * * *